No. 833,347. PATENTED OCT. 16, 1906.
H. V. SMITH.
DRAFT TRUCK FOR AGRICULTURAL IMPLEMENTS.
APPLICATION FILED JULY 14, 1906.

Witnesses
F. C. Barry
Geo. E. Few

Harry V. Smith
Inventor

Miles B. Stevens & Co.
Attorneys

UNITED STATES PATENT OFFICE.

HARRY V. SMITH, OF SUGAR GROVE, ILLINOIS.

DRAFT-TRUCK FOR AGRICULTURAL IMPLEMENTS.

No. 833,347.

Specification of Letters Patent.

Patented Oct. 16, 1906.

Application filed July 14, 1906. Serial No. 326,270.

*To all whom it may concern:*

Be it known that I, HARRY V. SMITH, a citizen of the United States, residing at Sugar Grove, in the county of Kane and State of Illinois, have invented new and useful Improvements in Draft-Trucks for Agricultural Implements, of which the following is a specification.

This invention is a draft attachment for agricultural implements, and particularly adapted for disk harrows, but it will be apparent that the attachment is not limited to such use, but may be applied to various other forms of harrows or to other agricultural implements of a similar kind.

The invention constitutes an improvement in the usual tongue connections to a harrow, and has for its object to relieve the horses of the weight of the implement and also of any side strain or side draft incident to the use of the implement.

The invention comprises a truck which carries the front part of the harrow and provided with a swiveling connection adjustable in various ways, as will be more fully hereinafter described.

Figure 1:
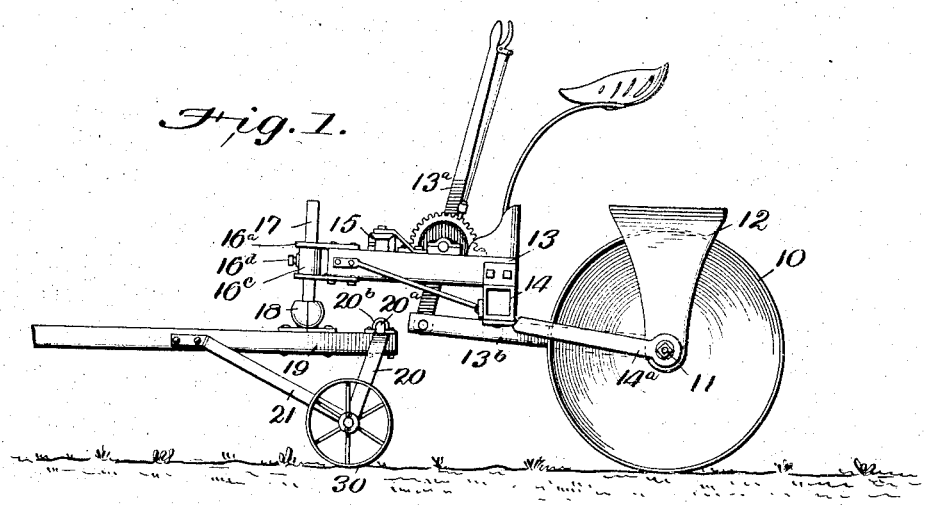
Figure 2:
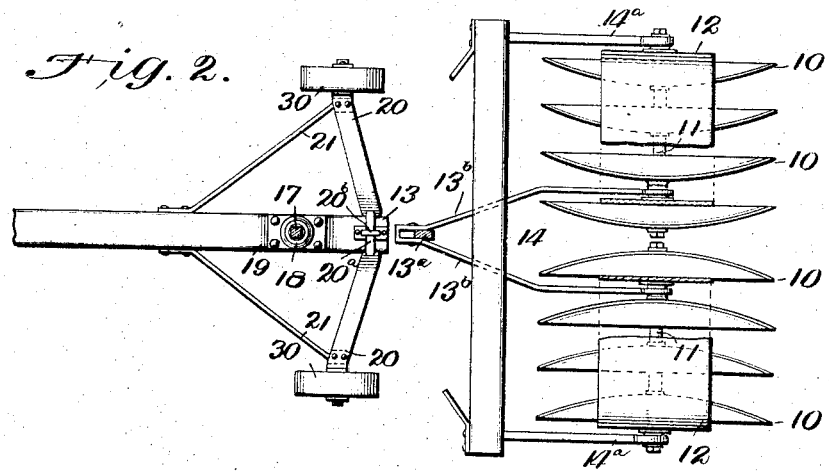
Figure 3:
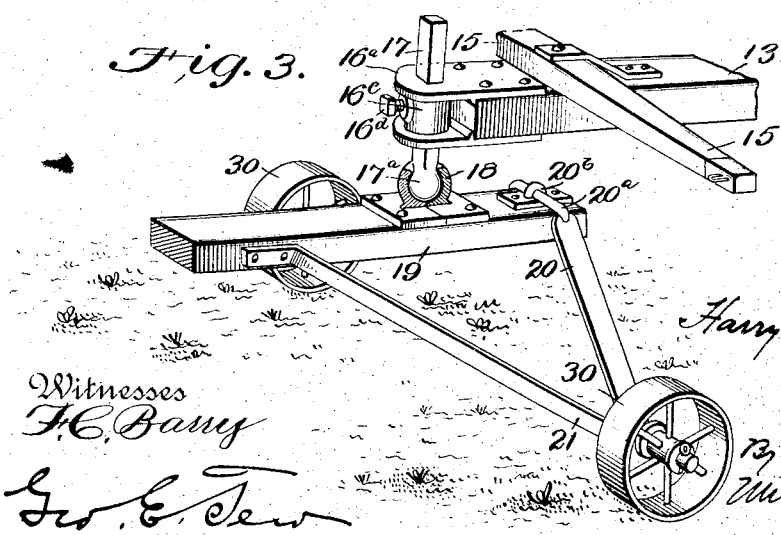

In the accompanying drawings, Figure 1 is a side elevation of a disk harrow provided with the invention. Fig. 2 is a partial plan view, the upper parts of the implement being removed to show the truck more clearly. Fig. 3 is a detail in perspective showing the connection between the truck and the implement.

Referring specifically to the drawings, 10 indicates disks of the usual type mounted on shafts 11, carried in hanger-frames 12. The front beam 13 supports the seat, and a whiffletree or draft-evener is attached thereto by the usual strap and bolt. This beam is fastened at its rear end upon a cross-beam 14, preferably a hollow metallic shape, connected at the ends by draft or supporting bars 14ª to the disk-shafts 11, which have the ordinary means for allowing the swing of the gangs to vary the angle of the disks to the line of draft. This variation or adjustment is effected by a lever 13ª, fulcrumed on the beam 13 and connected at its lower end by bars 13ᵇ to the axles 11.

The supporting-truck for the front part of the harrow comprises a tongue 19 and an arched axle 20, provided at the ends with wheels 30 and connected to the tongue by brace-bars 21. The axle-bar 20 may be formed of flat metal, but at the middle it has a round part 20ª, which extends through a loop 20ᵇ on the tongue.

A swiveling and supporting connection between the truck and the harrow-frame provided by means of a squared bolt 17, having a round head 17ª, which fits in a socket 18 on top of the tongue 19. Said bolt is carried by a bracket consisting of two plates 16ª, bolted, respectively, to the top and bottom of the front end of the beam 13. The bolt extends through square holes in these plates and between the plates is provided with a collar 16ᶜ, which may be set on the bolt by a set-screw 16ᵈ. By raising or lowering the collar the relative angle of the parts and the height of the whiffletree 15 are varied or adjusted.

It will be seen that the weight of the implement is supported at the front upon the truck described and the team carries no weight except that of the tongue 19 of the truck. The ball-and-socket joint provides a swiveling connection which allows a certain amount of side swing without throwing the tongue or the strain thereof upon the draft-animals. The vertical adjustment of the bolt 17 allows the line of draft, and consequently the depth of cut, to be varied. The location of the whiffletree 15 on the beam 13 affords a comparatively close and direct hitch to the harrow, which is advantageous, and also takes the draft off the bolt or connection between the truck and the implement.

I claim—

A draft attachment for implements, comprising a wheeled truck having a socket on top, a squared bolt having a ball at the lower end fitting in said socket, a draft-beam at the front of the implement having a bracket provided with a square hole through which the bolt extends, and an adjustable collar on the bolt under the bracket.

In testimony whereof I have signed my name to this specification in the presence of two subscribing witnesses.

HARRY V. SMITH.

Witnesses:
W. J. ROBINSON,
NELLIE FELTSKOG.